Figure 1:
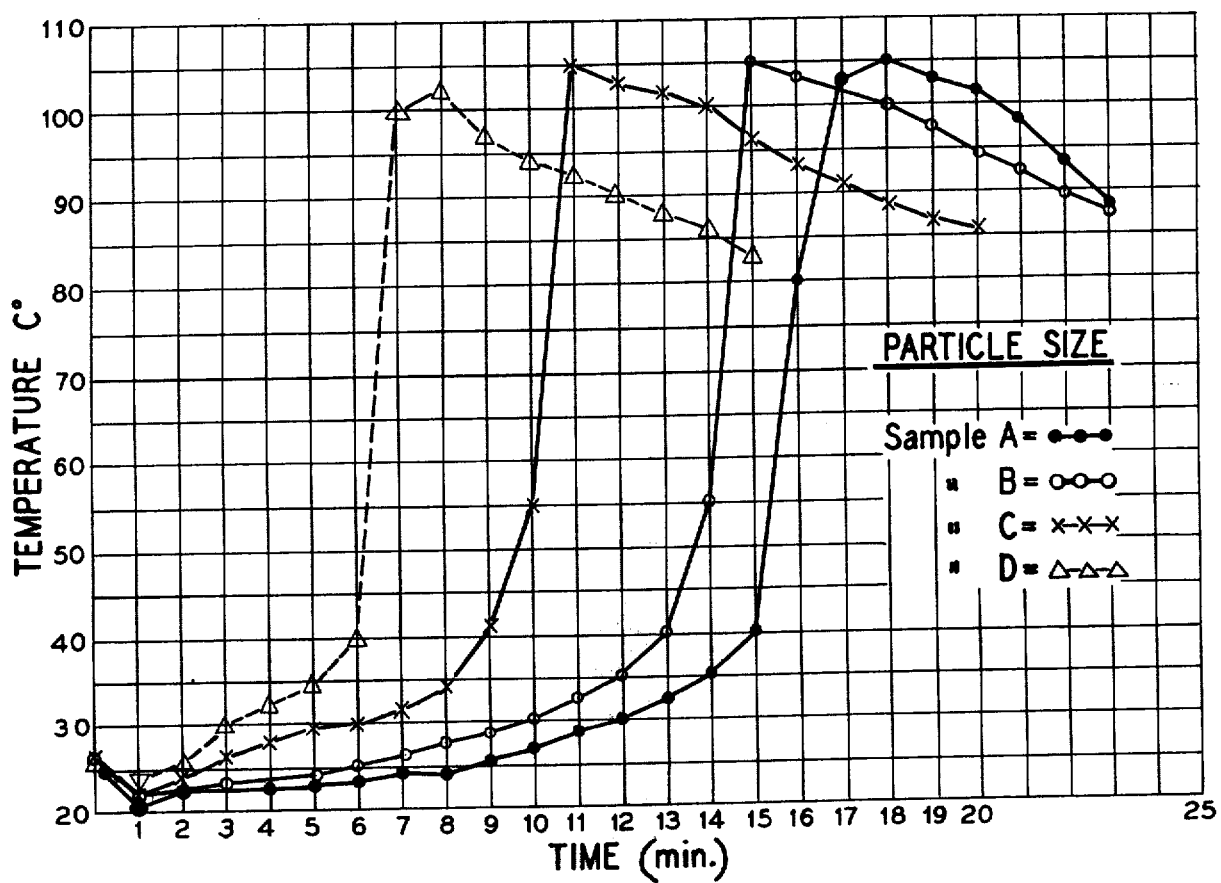

United States Patent [19]
Murtaugh

[11] 3,875,083
[45] Apr. 1, 1975

[54] HEAT-PRODUCING COMPOSITIONS

[75] Inventor: Justin J. Murtaugh, Guilford, Ind.

[73] Assignee: The Drackett Company, Cincinnati, Ohio

[22] Filed: June 27, 1973

[21] Appl. No.: 373,955

Related U.S. Application Data

[63] Continuation-in-part of Ser. No. 72,752, Sept. 16, 1970, abandoned.

[52] U.S. Cl............ 252/535, 252/135, 252/157, 252/188.3, 252/527
[51] Int. Cl............................................. C11d 7/48
[58] Field of Search....... 252/99, 102, 157, 188.3 R, 252/527, 535

[56] References Cited
UNITED STATES PATENTS

| | | | |
|---|---|---|---|
| 2,773,040 | 12/1956 | Walton | 252/157 |
| 2,816,012 | 12/1957 | Walton | 252/157 |
| 3,344,078 | 9/1967 | Graham et al. | 252/157 |
| 3,471,407 | 10/1969 | Spring | 252/157 |
| 3,503,890 | 3/1970 | Davisson et al. | 252/157 X |
| 3,576,751 | 4/1971 | Noznick et al. | 252/364 X |
| 3,630,936 | 12/1971 | Hill | 252/157 |

OTHER PUBLICATIONS

Mahan, University Chemistry, Addison–Wesley Publishing Co., Inc., New York, 1965, pp. 183 and 193 to 195.
Babor, Basic College Chemistry, 2nd Ed., Thomas Y. Crowell Co., N.Y., 1953, pp. 255–258.

Primary Examiner—Leland A. Sebastian
Attorney, Agent, or Firm—David J. Mugford; George A. Mentis

[57] ABSTRACT

This invention pertains to heat-producing compositions which are non-toxic and useful in cleaning pipes, drains, and the like. These compositions are comprised of powdered aluminum, an alkali metal nitrate and an alkali metal salt of an acid having at least one hydrogen atom with an ionization constant in water not exceeding $6.0 \times 10^{-9}$.

38 Claims, 3 Drawing Figures

HEAT-PRODUCING COMPOSITIONS

This application is a continuation-in-part of application Ser. No. 72,752, filed Sept. 16, 1970, now abandoned.

This invention is concerned with new and improved compositions which are heat-producing upon contact with water and which are useful as drain cleaners and the like.

Dry compositions which liberate heat upon contact with moisture are well-known and this type of composition has also been used in the drain cleaning art. For example, U.S. Pat. No. 2,773,040 (Walton) discloses heat-liberating compositions containing aluminum and an alkali metal hydroxide. U.S. Pat. No. 2,816,012 (Walton) discloses heat-producing compositions containing aluminum, an alkali-metal hydroxide, a water-soluble inorganic nitrate, and copper.

The compositions of the present invention represent an improvement over these prior art compositions and are comprised of powdered aluminum, an alkali metal nitrate, and a salt of an organic or inorganic acid, such as tri-sodium phosphate, or tri-potassium phosphate.

The novel drain cleaning compositions of the invention are nontoxic and have eliminated the use of caustic. It has been found that powdered aluminum will react with alkali metal salts of acids having at least one hydrogen atom with an ionization constant in water not exceeding $6.0 \times 10^{-9}$ to produce excellent heat-producing drain cleaners.

In accordance with the present invention, the new drain cleaning compositions are comprised of (1) powdered aluminum having a particle size of from about 1 to 300 microns, in an amount ranging from about 0.5 to about 16.7% by weight; (2) an alkali metal nitrate, in an amount ranging from about 16.0 to about 59.0% by weight; and (3) an alkali metal salt of an acid having at least one hydrogen atom with an ionization constant in water not exceeding $6.0 \times 10^{-9}$, in an amount ranging from about 36.0 to about 73.2% by weight.

Generally, the flow of water through a drain becomes obstructed by the accumulation of organic material lodged in the U-bend of the drain trap. The organic materials are usually bound together by a hot melted material, such as a fat, oil, or grease, which has cooled and solidified. For example, binding materials commonly found in a household drain are beef tallow, human fat deposits, and furniture wax residues. In order to unclog a drain, a good drain cleaner should be capable of producing a sufficient amount of heat to re-melt this binding material and dissolve the clog in order that the organic materials forming the clog may be carried in the flow of water through the drain.

In accordance with the invention, it has been determined that when about 0.5 to about 16.7% by weight of a powdered aluminum, about 16.0 to about 59.0% by weight of an alkali metal nitrate, and about 36.0 to about 73.2% by weight of an alkali metal salt of an acid having at least one hydrogen atom with an ionization constant in water not exceeding $6.0 \times 10^{-9}$ are combined, an effective non-toxic, heat-producing drain cleaner is produced which is capable of generating a sufficient amount of heat to raise the temperature of water above the minimum temperature necessary to re-melt the clogging material in the drain in order to dissolve the clog. The relative amounts of these materials may be varied depending on how much heat is desired to be generated or the time desired for the composition to unclog the drain. However, the drain-cleaning composition should be capable of generating heat sufficient to raise the temperature of water in the drain at the point of the clog above the minimum temperature necessary for dissolving the clog.

The following acids are contemplated by the present invention:

| Compound | Ionization Constant |
|---|---|
| Salicylic Acid | $1.0 \times 10^{-13}$ |
| Alpha Aminoacetic Acid | $1.67 \times 10^{-10}$ |
| Hydroquinone | $4.5 \times 10^{-11}$ |
| Para Hydroxybenzoic Acid | $4.8 \times 10^{-10}$ |
| Saccharin | $2.1 \times 10^{-12}$ |
| Carbonic Acid | $5.61 \times 10^{-11}$ |
| Pyrophosphoric Acid | $6 \times 10^{-9}$ |
| Ethylenediaminetetraacetic Acid | $5.5 \times 10^{-11}$ |
| Diethylenetriaminepentaacetic Acid | $3.8 \times 10^{-11}$ |
| N-Hydroxyethylenediaminetriacetic Acid | $1.86 \times 10^{-10}$ |
| Nitrilotriacetic Acid | $1.86 \times 10^{-10}$ |
| Phosphoric Acid | $4.8 \times 10^{-13}$ |

The salts of these acids used in the drain-cleaning compositions of the present invention are preferably the alkali metal salts such as sodium, potassium, lithium, rubidium, and cesium.

When a salt of an acid which has at least one hydrogen with an ionization constant of $6.0 \times 10^{-9}$ or less reacts with aluminum powder, free hydrogen is liberated. In the formulation of caustic heat-producing drain cleaners, the addition of oxidizing agents and particularly water-soluble nitrates have long been used to oxidize free hydrogen to non-gaseous compounds. In the oxidation-reduction reaction between free hydrogen and the nitrate ion, molecular hydrogen with zero valence is oxidized to combined hydrogen with a valence of plus one. The nitrogen combined in the nitrate ion with a valence of plus five is reduced to ammonia where it has a valence of minus three or to nitrate with a valence of plus three. The benefits are two-fold. The liberation of free hydrogen is prevented and the reaction is exothermic and thereby adding substantially to the generation of heat. Alkali metal nitrates are preferred.

The third hydrogen of phosphoric acid has an ionization constant in water of $4.8 \times 10^{-13}$. When properly formulated in accordance with the invention, the tri-sodium salt of this acid, which is used widely in industry and the household and not considered toxic or especially hazardous, can be used to make a good heat-producing drain cleaner. When a salt such as tri-sodium phosphate is combined with aluminum powder and the surface area is controlled by particle size, the reaction is exothermic and can be regulated so as to pass through a slowly rising temperature-time period until a vigorous turbulent hot reaction mixture is obtained. When these ingredients are combined with a water-soluble nitrate, mixed or conglomerated by way of fusion, compacted or granulated and pelletized to a limited particle range of 210 to 4760 microns, preferably 841 to 2380 microns, an excellent, non-toxic, non-hazardous drain cleaner is obtained. A balanced equation for the described reaction is given below:

$$8\ Al + 5\ Na_3PO_4 + 3\ NaNO_3 + 7H_2O = 8\ NaAlO_2 + 5\ NaAlO_4 + 3\ NH_3$$

In order to avoid segregation, caking or uncontrolled reaction rates it is important that all of the components are substantially homogeneously distributed. By preparing the compositions in accordance with the invention there is a delayed but controllable induction period of the reaction of the components with the water at the site of the drain impediment.

The rate of reaction will depend chiefly on the temperature of the water and the particle size of the aluminum. For any given particle size the rate of reaction will increase as the temperature of the water increases. It is important that the initial heat production must be such to provide (1) heat loss due to dissipation from the system and (2) sufficient heat to raise the temperature of the surrounding water and suspended solids so that the auto-catalytic effect of temperature will provide an increased rate of reaction resulting in a hot boiling mixture. An ideal formulation would contain aluminum particles of different sizes. This would provide for initial heat generating by smaller particles and then a slower extended reaction of a selected distribution of somewhat larger particles. Although such a distribution of aluminum particle size is desirable, it is not necessary to a useful product. It has been found that by formulating with mixtures of aluminum powders having a particle size range of from below one micron to 300 microns and preferably from 15 to 50 microns, a very effective heat-producing drain cleaner can be produced.

From the equation given for the reaction of aluminum, tri-sodium phosphate, sodium nitrate and water, one can calculate 215.76 g. of aluminum will react with 819.86 g. of tri-sodium phosphate and 255.03 g. of sodium nitrate. This is a ratio of 8 moles of aluminum to 5 moles of tri-sodium phosphate to 3 moles of sodium nitrate. The 8-5-3 ratio given above would contain 16.7% aluminum powder. A product composition containing this much aluminum would provide more heat than would be desirable for the usual 30–45 g. charge added to a clogged drain. A heat-producing composition, according to the invention, can be prepared with an aluminum powder content as low as 0.5%; however, for best performance with maximum safety it is preferred to use a composition containing 4.1% aluminum.

The reaction ratio of 8-5-3 requires 3 moles of sodium nitrate or 1.18 g. of sodium nitrate for each gram of aluminum powder. This is the theoretical lower limit which can be formulated without liberating free hydrogen gas. To provide for a greater margin of safety, it is preferred to use 4 to 8 g. of sodium nitrate or its equivalent as potassium nitrate for each gram of aluminum powder.

From the equation it can be seen that five moles of tri-sodium phosphate, or any other reacting salt, is required for each 8 moles of aluminum powder. In the case of tri-sodium phosphate, this is 3.8 g. for each gram of aluminum powder. Maximum usage for heat generation and insured conversion to the water soluble aluminate ion is best carried out in the presence of an excess of the reacting salt. Compositions may be prepared with as low as 10% tri-sodium phosphate. This would be a molar ratio of 0.4 moles for each mole of aluminum powder at the preferred aluminum powder composition of 4.1%. For reasons of simplicity most of the foregoing discussion has been limited to aluminum powder, tri-sodium phosphate and sodium nitrate.

Due to the low water solubility of disodium hydrogen phosphate hydrate ($Na_2HPO_4 \cdot 12H_2O$), one of the products of the reaction when the ingredients are mixed in the presence of water, it is preferred to use potassium salts or to incorporate a considerable portion of potassium ions into the formulation. $Na_2HPO_4 \cdot 12H_2O$ has a melting point of 35.1°C. and a solubility of only 4.15 g. per 100 ml. in cold water. If the products of the reaction mixture in my new drain cleaner are not washed out of the drain while still hot, the $Na_2HPO_4 \cdot 12H_2O$ can crystallize out of solution. By using tri-potassium phosphate and sodium nitrate or tri-sodium phosphate and potassium nitrate, crystallization of insoluble di-sodium hydrogen phosphate hydrate is prevented even if the reaction products are not flushed from the drain before cooling.

Thus, the presence of potassium ions prevents the crystallization of insoluble $Na_2HPO_4 \cdot 12H_2O$ which has a solubility of 4.15 grams per 100 ml. of cold water. The formulations of the present invention exceed this value by more than 300%.

The preferred compositions according to the invention include non-aqueous, tacky liquid surfactants such as sulfonated mineral oil (e.g. Twitchells) or the combinations of mono and diphosphate esters of ethoxylated linear alcohol (e.g. GAFACS) or oxyethylated primary straight chain alcohols wherein the alcohols contain from 12 to 20 carbons and 80% ethylene oxide is used, (e.g. Plurofacs). However, any other tacky material may also be used.

In order to illustrate the invention, the following examples are given

EXAMPLE 1

59.0 g. of potassium nitrate, 36.0 g. of tri-sodium phosphate and 5.0 g. of aluminum powder were mixed and fused at 360°C. The fused mixture was allowed to cool and then granulated. 30.0 g. of granulated material were added to 100 ml. of water at 30°C. in a 300 ml. test tube. After 5 minutes the temperature of the water increased to 100°C. The temperature rise was accompanied by vigorous agitation in the lower portion of the test tube. The 100°C. temperature was maintained for 6 minutes.

EXAMPLE 2

20.0 g. of sodium nitrate were mixed with 18.3 g. of tri-potassium phosphate and 1.7 g. of powdered aluminum. The mixture was heated over a burner until fusion of the sodium nitrate occurred. Upon cooling, a hard cake was formed. The cake was granulated to about 6-20 mesh and 30.0 g. added to 100 ml. of water in a large test tube. A slow temperature rise was observed, starting at 25°C. and going up to 50°C. in 8 minutes. The temperature then increased rapidly to 103°C. and held there for seven minutes.

EXAMPLE 3

3.0 g. of powdered tri-sodium phosphate, 1.2 g. of aluminum powder, and 0.8 g. of potassium nitrate were fused at 380°C. After cooling, the fused mixture was granulated and added to 5.8 g. of potassium chloride, 9.8 g. of potassium nitrate and 10.0 of granular tri-sodium phosphate. 30.0 g. of this mixture were added to 100 ml. of water at 25°C. in a 300 ml. test tube. After 2 minutes, the temperature increased to 99°C. in the lower half of the test tube.

EXAMPLE 4

1440 g. of tri-potassium phosphate, 60 g. of Plurofax A-38 (a non-ionic surfactant) and 1371 g. of sodium nitrate were mixed and powdered by passing through a hammer mill. After grinding, 2400 g. of the powdered mixture were mixed with 107.5 g. of aluminum powder, 250 g. of white mineral oil, and .65 g. of green pigment (Phthalo green). The mix was then pelletized with a laboratory model "California Pellet Mill" using a 3/16 × 1 inch die. The resulting green pellets were very hard. When a 30 g. sample was added to 100 g. of water at 25°C. in a 300 ml. test tube, the temperature of the water in the lower half of the test tube increased slowly over a 5-minute period to 100°C. At 100°C, the pellets disintegrated and a churning action was observed.

EXAMPLE 5

9.0 g. of potassium nitrate were mixed with 0.6 g. of "Twitchell 8266" (a liquid sulfonic acid type surfactant). After the potassium nitrate was added to the surfactant 1.23 g. of aluminum powder were added. Upon additional mixing, the aluminum powder adhered to the surface of the potassium nitrate. 7.5 g. of tri-sodium phosphate and 11.67 g. of potassium chloride were then added. The formulation was mixed and added to 100 ml. of water at 25°C. in a 300 ml. test tube. The temperature increased slowly; but after 15 minutes the temperature of the water in the lower portion of the test tube had increased to 100°C. and the reaction proceeded with vigorous agitation.

It can be seen from the above examples that the relative proportions of the ingredients may be varied greatly. The variation of relative proportions of ingredients allowed in producing an effective heat-generating drain cleaner composition can be shown by utilizing the compositions of this invention in the following drain cleaner test system:

A 25 gram mixture, consisting of 2% hair, 40% calcium soap curd, 20% coffee grounds, and 38% hot melted beef fat, was placed at the bottom of the U-bend of a drain trap in a common household 1¼ inch metal drain. The clog mixture was constructed so as to completely obstruct the flow of water from the inlet side to the outlet side of the drain trap. Water was added to both sides of the trap until it reached the level of the exit side runoff. As illustrated in the following examples shown in Table 1, 100 grams of the ingredients of compositions of this invention, varied in relative proportions of ingredients for each example, were mixed to obtain a homogenous mixture, which was then pressed into 10 individual 10-gram tablets at 24,000 lbs. per square inch. The 10-gram tablets were then broken down and granulated to about 841 to about 2380 micron size. The test sample weight of the granulated material, shown in Table I for each example, was then added to the closed drain trap, after which one cup of water was added to the inlet side, raising the water level in the inlet side higher than in the exit side. A thermometer was placed in the inlet side so that the thermometer bulb was at or near the location of the clog and test sample. In all examples of Table I, a hot solution developed at the location of the clog. As the hot mixture melted the clog, water from the inlet side of the trap passed through the clog to the exit side, as shown by the water flow from the exit side of the drain. After an additional 5 minutes from the time that the exit side water flow began, 1 liter of water was added to the inlet side, which ran off at the exit side evidencing an uninhibited water flow. For all examples given in Table I, the material originally used to make the clog washed out of the trap. At this time, the drain was completely unclogged and free flowing.

In accordance with this invention, heat-producing compositions comprising powdered aluminum, in an amount from about 0.5 to about 16.7% by weight; an alkali metal nitrate, in an amount from about 16 to about 59% by weight; and an alkali metal salt of an acid wherein the acid has at least one hydrogen atom with an ionization constant not exceeding $6.0 \times 10^{-9}$, in an amount from about 36 to about 73.2% by weight, are effective drain cleaners.

As shown by the following examples in Table I, compositions prepared, as described above, were effective in dissolving a clog in the drain allowing a free flow of water.

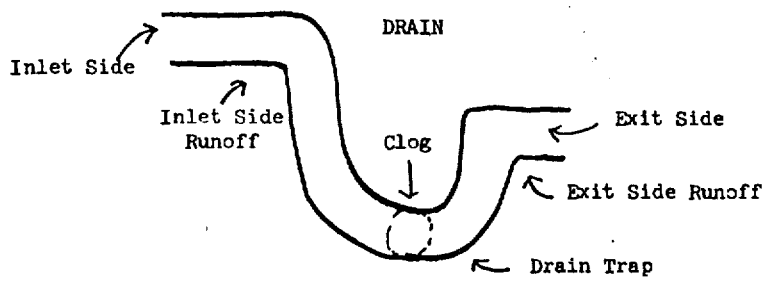

TABLE I

| Example No.<br>Example No. 1 | % | Weight of Sample Added to Clogged Drain (g.) | Time Required to Open Drain (min.) | Temp. at Clog When Opened (°C) |
|---|---|---|---|---|
| Ingredient | | | | |
| Na$_3$PO$_4$ | 36.0 | | | |
| Na NO$_3$ | 16.0 | | | |
| Aluminum Powder (2) | .5 | | | |
| Na-Gluconate | 10.0 | | | |
| NaCl | 37.5 | | | |
| | 100.0% | 75 | 11 | 87 |

TABLE I—Continued

| Example No. | % | Weight of Sample Added to Clogged Drain (g.) | Time Required to Open Drain (min.) | Temp. at Clog When Opened (°C) |
|---|---|---|---|---|
| Example No. 2 | | | | |
| Ingredient | | | | |
| Na₃PO₄ | 36.0 | | | |
| Na NO₃ | 16.0 | | | |
| Aluminum Powder (2) | 16.7 | | | |
| NaCl | 31.3 | | | |
| | 100.0% | 30 | 7 | 101 |
| Example No. 3 | | | | |
| Ingredient | | | | |
| Na₃PO₄ | 36.0 | | | |
| Na NO₃ | 59.0 | | | |
| Aluminum Powder (2) | 5.0 | | | |
| | 100.0% | 50 | 8 | 100 |
| Example No. 4 | | | | |
| Ingredient | | | | |
| Na₃PO₄ | 36.0 | | | |
| NaNO₃ | 59.0 | | | |
| Aluminum Powder (2) | .5 | | | |
| NaCl | 4.5 | | | |
| | 100.0% | 75 | 8 | 89 |
| Example No. 5 | | | | |
| Ingredient | | | | |
| Na₃PO₄ | 73.2 | | | |
| Na NO₃ | 16.0 | | | |
| Aluminum Powder (2) | .5 | | | |
| NaCl | 10.3 | | | |
| | 100.0% | 75 | 9 | 90 |
| Example No. 6 | | | | |
| Ingredient | | | | |
| Na₃PO₄ | 73.2 | | | |
| Na NO₃ | 16.0 | | | |
| Aluminum Powder (1) | 10.8 | | | |
| | 100.0% | 50 | 9 | 100 |
| Example No. 7 | | | | |
| Ingredient | | | | |
| Na₃PO₄ | 36.0 | | | |
| Na NO₃ | 47.3 | | | |
| Aluminum Powder (1) | 16.7 | | | |
| | 100.0% | 50 | 12 | 100 |
| Example No. 8 | | | | |
| Ingredient | | | | |
| Na₃PO₄ | 50.0 | | | |
| Na NO₃ | 49.5 | | | |
| Aluminum Powder (3) | .5 | | | |
| | 100.0% | 75 | 8 | 90 |
| Example 9 | | | | |
| Ingredient | | | | |
| K₃PO₄ | 36.0 | | | |
| K NO₃ | 16.0 | | | |
| Aluminum Powder (3) | .5 | | | |
| Na-Gluconate | 10.0 | | | |
| KCl | 37.5 | | | |
| | 100.0% | 75 | 12 | 92 |
| Example 10 | | | | |
| Ingredient | | | | |
| K₃PO₄ | 36.0 | | | |
| K NO₃ | 16.0 | | | |
| Aluminum Powder (2) | 16.7 | | | |
| KCl | 31.3 | | | |
| | 100.0% | 50 | 9 | 102 |
| Example 11 | | | | |
| Ingredient | | | | |
| K₃PO₄ | 36.0 | | | |
| K NO₃ | 59.0 | | | |
| Aluminum Powder (3) | 5.0 | | | |
| | 100.0% | 50 | 7 | 96 |
| Example 12 | | | | |
| Ingredient | | | | |
| K₃PO₄ | 36.0 | | | |
| K NO₃ | 59.0 | | | |
| Aluminum Powder (3) | .5 | | | |
| K Cl | 4.5 | | | |
| | 100.0% | 75 | 8 | 93 |

TABLE I—Continued

| Example No. | | % | Weight of Sample Added to Clogged Drain (g.) | Time Required to Open Drain (min.) | Temp. at Clog When Opened (°C) |
|---|---|---|---|---|---|
| Example 13 | | | | | |
| Ingredient | | | | | |
| | K₃PO₄ | 73.2 | | | |
| | K NO₃ | 16.0 | | | |
| | Aluminum Powder (1) | .5 | | | |
| | KCl | 10.3 | | | |
| | | 100.0% | 50 | 14 | 100 |
| Example 14 | | | | | |
| Ingredient | | | | | |
| | K₃PO₄ | 73.2 | | | |
| | K NO₃ | 16.0 | | | |
| | Aluminum Powder (1) | 10.8 | | | |
| | | 100.0% | 50 | 12 | 103 |
| Example 15 | | | | | |
| Ingredient | | | | | |
| | K₃PO₄ | 36.0 | | | |
| | K NO₃ | 47.3 | | | |
| | Aluminum Powder (3) | 16.7 | | | |
| | | 100.0% | 30 | 8 | 101 |
| Example 16 | | | | | |
| Ingredient | | | | | |
| | K₃PO₄ | 50.0 | | | |
| | K NO₃ | 49.5 | | | |
| | Aluminum Powder (2) | .5 | | | |
| | | 100.0% | 75 | 7 | 90 |
| Example 17 | | | | | |
| Ingredient | | | | | |
| | Na₃PO₄ | 40.0 | | | |
| | K NO₃ | 20.0 | | | |
| | Na-Gluconate | 3.0 | | | |
| | Aluminum Powder (2) | 4.2 | | | |
| | K Cl | 32.8 | | | |
| | | 100.0% | 30 | 7 | 102 |
| Example 18 | | | | | |
| Ingredient | | | | | |
| | Na₂CO₃ | 36.0 | | | |
| | Na NO₃ | 16.0 | | | |
| | Aluminum (3) | .5 | | | |
| | Na-Gluconate | 10.0 | | | |
| | NaCl | 37.5 | | | |
| | | 100.0% | 75 | 16 | 77 |
| Example 19 | | | | | |
| Ingredient | | | | | |
| | Na₂CO₃ | 36.0 | | | |
| | Na NO₃ | 16.0 | | | |
| | Aluminum Powder (3) | 16.7 | | | |
| | NaCl | 31.3 | | | |
| | | 100.0% | 50 | 19 | 100 |
| Example 20 | | | | | |
| Ingredient | | | | | |
| | Na₂CO₃ | 36.0 | | | |
| | NaNO₃ | 59.0 | | | |
| | Aluminum Powder (3) | 5.0 | | | |
| | | 100.0% | 50 | 19 | 103 |
| Example 21 | | | | | |
| Ingredient | | | | | |
| | Na₂CO₃ | 36.0 | | | |
| | Na NO₃ | 59.0 | | | |
| | Aluminum Powder (3) | .5 | | | |
| | Na Cl | 4.5 | | | |
| | | 100.0% | 75 | 18 | 89 |
| Example 22 | | | | | |
| Ingredient | | | | | |
| | Na₂CO₃ | 73.2 | | | |
| | Na NO₃ | 16.0 | | | |
| | Aluminum Powder (2) | .5 | | | |
| | NaCl | 10.3 | | | |
| | | 100.0% | 75 | 16 | 100 |

TABLE I—Continued

| Example No. | % | Weight of Sample Added to Clogged Drain (g.) | Time Required to Open Drain (min.) | Temp. at Clog When Opened (°C) |
|---|---|---|---|---|
| Example 23 | | | | |
| Ingredient | | | | |
| Na₂CO₃ | 73.2 | | | |
| NaNO₃ | 16.0 | | | |
| Aluminum Powder (1) | 10.8 | | | |
| | 100.0% | 50 | 10 | 102 |
| Example 24 | | | | |
| Ingredient | | | | |
| Na₂CO₃ | 36.0 | | | |
| Na NO₃ | 47.3 | | | |
| Aluminum Powder (3) | 16.7 | | | |
| | 100.0% | 75 | 15 | 103 |
| Example 25 | | | | |
| Ingredient | | | | |
| Na₂CO₃ | 50.0 | | | |
| Na NO₃ | 49.5 | | | |
| Aluminum Powder (3) | .5 | | | |
| | 100.0% | 75 | 19 | 75 |
| Example 26 | | | | |
| Ingredient | | | | |
| K₂CO₃ | 36.0 | | | |
| K NO₃ | 16.0 | | | |
| Aluminum Powder (3) | .5 | | | |
| Na-Gluconate | 10.0 | | | |
| KCl | 37.5 | | | |
| | 100.0% | 75 | 16 | 89 |
| Example 27 | | | | |
| Ingredient | | | | |
| K₂CO₃ | 36.0 | | | |
| K NO₃ | 16.0 | | | |
| Aluminum Powder (2) | 16.7 | | | |
| KCl | 31.3 | | | |
| | 100.0% | 50 | 9 | 104 |
| Example 28 | | | | |
| Ingredient | | | | |
| K₂CO₃ | 36.0 | | | |
| K NO₃ | 59.0 | | | |
| Aluminum Powder (2) | 5.0 | | | |
| | 100.0% | 75 | 12 | 101 |
| Example 29 | | | | |
| Ingredient | | | | |
| K₂CO₃ | 36.0 | | | |
| K NO₃ | 59.0 | | | |
| Aluminum Powder (3) | .5 | | | |
| K Cl | 4.5 | | | |
| | 100.0% | 75 | 18 | 92 |
| Example 30 | | | | |
| Ingredient | | | | |
| K₂CO₃ | 73.2 | | | |
| K NO₃ | 16.0 | | | |
| Aluminum Powder (2) | .5 | | | |
| K Cl | 10.3 | | | |
| | 100.0% | 75 | 9 | 87 |
| Example 31 | | | | |
| Ingredient | | | | |
| K₂CO₃ | 73.2 | | | |
| K NO₃ | 16.0 | | | |
| Aluminum Powder (1) | 10.8 | | | |
| | 100.0% | 50 | 8 | 104 |
| Example 32 | | | | |
| Ingredient | | | | |
| K₂CO₃ | 36.0 | | | |
| K NO₃ | 47.3 | | | |
| Aluminum Powder (2) | 16.7 | | | |
| | 100.0% | 50 | 9 | 102 |
| Example 33 | | | | |
| Ingredient | | | | |
| K₂CO₃ | 50.0 | | | |
| K NO₃ | 49.5 | | | |
| Aluminum Powder (3) | .5 | | | |
| | 100.0% | 75 | 13 | 89 |

TABLE 1—Continued

| Example No. | % | Weight of Sample Added to Clogged Drain (g.) | Time Required to Open Drain (min.) | Temp. at Clog When Opened (°C) |
|---|---|---|---|---|
| Example 34 | | | | |
| Ingredient | | | | |
| Na$_2$CO$_3$ | 50 | | | |
| K NO$_3$ | 25 | | | |
| Aluminum Powder (2) | 4.2 | | | |
| Na-Gluconate | 5.0 | | | |
| K Cl | 15.8 | | | |
| | 100.0% | 30 | 7 | 102 |
| Example 35 | | | | |
| Ingredient | | | | |
| Na$_3$PO$_4$ | 10.0 | | | |
| K$_3$PO$_4$ | 10.0 | | | |
| Na$_2$CO$_3$ | 10.0 | | | |
| K$_2$CO$_3$ | 10.0 | | | |
| K NO$_3$ | 10.0 | | | |
| Na NO$_3$ | 10.0 | | | |
| Aluminum Powder (2) | 4.2 | | | |
| Na-Gluconate | 7.0 | | | |
| Na Cl | 14.4 | | | |
| K Cl | 14.4 | | | |
| | 100.0% | 50 | 7 | 103 |
| Example 36 | | | | |
| Ingredient | | | | |
| Na$_4$P$_2$O$_7$ | 36.0 | | | |
| K NO$_3$ | 16.0 | | | |
| Aluminum Powder (3) | 16.7 | | | |
| K Cl | 31.3 | | | |
| | 100.0% | 75 | 25 | 101 |
| Example 37 | | | | |
| Ingredient | | | | |
| K$_4$P$_2$O$_7$ | 73.2 | | | |
| Na NO$_3$ | 16.0 | | | |
| Aluminum Powder (2) | .5 | | | |
| NaCl | 10.3 | | | |
| | 100.0% | 75 | 11 | 90 |
| Example 38 | | | | |
| Ingredient | | | | |
| Na$_4$P$_2$O$_7$ | 50.0 | | | |
| K NO$_3$ | 30.0 | | | |
| Aluminum Powder (2) | 4.2 | | | |
| Na-Gluconate | 7.0 | | | |
| KCl | 8.8 | | | |
| | 100.0% | 50 | 15 | 101 |
| Example 39 | | | | |
| Ingredient | | | | |
| Ethylenediamine-tetraacetic Acid (Tetra-Sodium Salt) | 36.0 | | | |
| K NO$_3$ | 16.0 | | | |
| Aluminum Powder (3) | 16.7 | | | |
| KCl | 31.3 | | | |
| | 100.00% | 75 | 18 | 100 |
| Example 40 | | | | |
| Ingredient | | | | |
| Ethylenediamine-tetraacetic Acid (Tetra-Sodium Salt) | 73.2 | | | |
| NaNO$_3$ | 16.0 | | | |
| Aluminum Powder (1) | .5 | | | |
| NaCl | 10.3 | | | |
| | 100.0% | 50 | 11 | 86 |
| Example 41 | | | | |
| Ingredient | | | | |
| Ethylenediamine-tetraacetic Acid (Tetra-Sodium Salt) | 50.0 | | | |
| KNO$_3$ | 30.0 | | | |
| Aluminum Powder (2) | 4.2 | | | |
| KCl | 15.8 | | | |
| | 100.0% | 50 | 9 | 100 |

TABLE I—Continued

| Example No. | % | Weight of Sample Added to Clogged Drain (g.) | Time Required to Open Drain (min.) | Temp. at Clog When Opened (°C) |
|---|---|---|---|---|
| Example 42 Ingredient | | | | |
| Nitrilotriacetic Acid (Tri-Sodium Salt) | 36.0 | | | |
| $KNO_3$ | 16.0 | | | |
| Aluminum Powder (3) | 16.7 | | | |
| KCl | 31.3 | | | |
| | 100.0% | 75 | 15 | 82 |
| Example 43 Ingredient | | | | |
| Nitrilotriacetic Acid (Tri-Sodium Salt) | 73.2 | | | |
| $NaNO_3$ | 16.0 | | | |
| Aluminum Powder (1) | .5 | | | |
| NaCl | 10.3 | | | |
| | 100.0% | 50 | 9 | 101 |
| Example 44 Ingredient | | | | |
| Nitrilotriacetic Acid (Tri-Sodium Salt) | 50.0 | | | |
| $KNO_3$ | 30.0 | | | |
| Aluminum Powder (2) | 4.2 | | | |
| KCl | 15.8 | | | |
| | 100.0% | 50 | 12 | 102 |
| Example 45 Ingredient | | | | |
| N-hydroxy-ethylenediamine-triacetic Acid (Tri-Sodium Salt) | 36.0 | | | |
| $KNO_3$ | 16.0 | | | |
| Aluminum Powder (3) | 16.7 | | | |
| KCl | 31.3 | | | |
| | 100.0% | 50 | 10 | 99 |
| Example 46 Ingredient | | | | |
| N-hydroxy-ethylenediamine-triacetic Acid (Tri-Sodium Salt) | 73.2 | | | |
| $NaNO_3$ | 16.0 | | | |
| Aluminum Powder (1) | .5 | | | |
| NaCl | 10.3 | | | |
| | 100.0% | 75 | 13 | 87 |
| Example 47 Ingredient | | | | |
| N-hydroxy-ethylenediamine-triacetic acid (Tri-Sodium Salt) | 50.0 | | | |
| $KNO_3$ | 30.0 | | | |
| Aluminum Powder (2) | 4.2 | | | |
| KCl | 15.8 | | | |
| | 100.0% | 50 | 15 | 102 |
| Example 48 Ingredient | | | | |
| Diethylenetriamine-pentaacetic Acid (Penta-Sodium Salt) | 36.0 | | | |
| $KNO_3$ | 16.0 | | | |
| Aluminum Powder (3) | 16.7 | | | |
| KCl | 31.3 | | | |
| | 100.0% | 50 | 9 | 101 |
| Example 49 Ingredient | | | | |
| Diethylenetriaminepenta-acetic Acid (Penta-Sodium Salt) | 73.2 | | | |
| $NaNO_3$ | 16.0 | | | |
| Aluminum Powder (1) | .5 | | | |
| NaCl | 10.3 | | | |
| | 100.0% | 75 | 15 | 102 |

3,875,083

TABLE I—Continued

| Example No. | % | Weight of Sample Added to Clogged Drain (g.) | Time Required to Open Drain (min.) | Temp. at Clog When Opened (°C) |
|---|---|---|---|---|
| Example 50 | | | | |
| Ingredient | | | | |
| Diethylenetriaminepenta-acetic Acid (Penta-Sodium Salt) | 50.0 | | | |
| KNO₃ | 30.0 | | | |
| Aluminum Powder (2) | 4.2 | | | |
| KCl | 15.8 | | | |
| | 100.0% | 50 | 14 | 103 |
| Example 51 | | | | |
| Ingredient | | | | |
| Saccharin (Sodium Salt) | 36.0 | | | |
| KNO₃ | 16.0 | | | |
| Aluminum Powder (3) | 16.7 | | | |
| KCl | 31.3 | | | |
| | 100.0% | 50 | 10 | 89 |
| Example 52 | | | | |
| Ingredient | | | | |
| Saccharin (Sodium Salt) | 73.2 | | | |
| NaNO₃ | 16.0 | | | |
| Aluminum Powder (1) | .5 | | | |
| NaCl | 10.3 | | | |
| | 100.0% | 75 | 15 | 90 |
| Example 53 | | | | |
| Ingredient | | | | |
| Saccharin (Sodium Salt) | 50.0 | | | |
| KNO₃ | 30.0 | | | |
| Aluminum Powder (2) | 4.2 | | | |
| KCl | 15.8 | | | |
| | 100.0% | 50 | 17 | 102 |
| Example 54 | | | | |
| Ingredient | | | | |
| Para Hydroxybenzoic Acid (Di-Sodium Salt) | 36.0 | | | |
| KNO₃ | 16.0 | | | |
| Aluminum Powder (3) | 16.7 | | | |
| K Cl | 31.7 | | | |
| | 100.0% | 50 | 16 | 99 |
| Example 55 | | | | |
| Ingredient | | | | |
| Para Hydroxybenzoic Acid (Di-Sodium Salt) | 73.0 | | | |
| NaNO₃ | 16.0 | | | |
| Aluminum Powder (1) | .5 | | | |
| NaCl | 10.3 | | | |
| | 100.0% | 75 | 14 | 84 |
| Example 56 | | | | |
| Ingredient | | | | |
| Para Hydroxybenzoic Acid (Di-Sodium Salt) | 50.0 | | | |
| KNO₃ | 30.0 | | | |
| Aluminum Powder (2) | 4.2 | | | |
| KCl | 15.8 | | | |
| | 100.0% | 50 | 12 | 103 |
| Example 57 | | | | |
| Ingredient | | | | |
| Hydroquinone (Sodium Salt) | 36.0 | | | |
| KNO₃ | 16.0 | | | |
| Aluminum Powder (3) | 16.7 | | | |
| KCl | 31.7 | | | |
| | 100.0% | 50 | 8 | 100 |
| Example 58 | | | | |
| Ingredient | | | | |
| Hydroquinone (Sodium Salt) | 73.0 | | | |
| NaNO₃ | 16.0 | | | |
| Aluminum Powder (1) | .5 | | | |
| NaCl | 10.3 | | | |
| | 100.0% | 75 | 11 | 92 |

TABLE I—Continued

| Example No. | % | Weight of Sample Added to Clogged Drain (g.) | Time Required to Open Drain (min.) | Temp. at Clog When Opened (°C) |
|---|---|---|---|---|
| Example 59 | | | | |
| Ingredient | | | | |
| Hydroquinone (Sodium Salt) | 50.0 | | | |
| KNO₃ | 30.0 | | | |
| Aluminum Powder (2) | 4.2 | | | |
| KCl | 15.8 | | | |
| | 100.0% | 30 | 8 | 103 |
| Example 60 | | | | |
| Ingredient | | | | |
| Alpha Aminoacetic Acid (Sodium Salt) | 36.0 | | | |
| KNO₃ | 16.0 | | | |
| Aluminum Powder (2) | 16.7 | | | |
| KCl | 31.7 | | | |
| | 100.0% | 50 | 9 | 101 |
| Example 61 | | | | |
| Ingredient | | | | |
| Alpha Aminoacetic Acid (Sodium Salt) | 73.0 | | | |
| NaNO₃ | 16.0 | | | |
| Aluminum Powder (1) | .5 | | | |
| NaCl | 10.3 | | | |
| | 100.0% | 75 | 10 | 99 |
| Example 62 | | | | |
| Ingredient | | | | |
| Alpha Aminoacetic Acid (Sodium Salt) | 50.0 | | | |
| KNO₃ | 30.0 | | | |
| Aluminum Powder (2) | 4.2 | | | |
| KCl | 15.8 | | | |
| | 100.0% | 30 | 9 | 104 |
| Example 63 | | | | |
| Ingredient | | | | |
| Salicylic Acid (Di-Sodium Salt) | 36.0 | | | |
| KNO₃ | 16.0 | | | |
| Aluminum Powder (3) | 16.7 | | | |
| KCl | 31.7 | | | |
| | 100.0% | 50 | 8 | 103 |
| Example 64 | | | | |
| Ingredient | | | | |
| Salicylic Acid (Di-Sodium Salt) | 73.0 | | | |
| NaNO₃ | 16.0 | | | |
| Aluminum Powder (1) | .5 | | | |
| NaCl | 10.3 | | | |
| | 100.0% | 75 | 10 | 92 |
| Example 65 | | | | |
| Ingredient | | | | |
| Salicylic Acid (Di-Sodium Salt) | 50.0 | | | |
| KNO₃ | 30.0 | | | |
| Aluminum Powder (2) | 4.2 | | | |
| KCl | 15.8 | | | |
| | 100.0% | 30 | 8 | 104 |

Notes to TABLE I
(1.) Aluminum Powder 250 to 297 micron particle size
(2.) Aluminum Powder 10 to 20 micron particle size
(3.) Aluminum Powder 1 to 8 micron particle size Sodium or potassium chloride and sodium gluconate were used in some compositions of the above-listed examples as fillers and as binders to aid in preventing segregation of ingredients in order to maintain a homogeneous distribution of ingredients in the composition.

As can be seen from the examples in Table I, the heat-producing compositions of this invention are effective in dissolving a clog, and subsequently, cleaning a drain in a relatively short period of time. Also, it can be seen from the above examples, that the relative proportions of ingredients in the heat-producing compositions, the weight of sample of the composition added to the clogged drain, the time required to open the clogged drain, and the temperature at the clog when the drain was opened, vary for the different examples; however, in each example a composition comprising powdered aluminum, an alkali metal nitrate, and an alkali metal salt of an acid having at least one hydrogen atom with an ionization constant not exceeding $6.0 \times 10^{-9}$, has been effective in opening a clogged drain.

The following examples are further illustrations of heat-producing drain-cleaner compositions of the present invention:

Example 1

| Ingredient | % |
|---|---|
| $Na_4P_2O_7$ | 36.0 |
| $KNO_3$ | 16.0 |
| Aluminum Powder (3) | 0.5 |
| KCl | 47.5 |
| | 100.0% |

Example 2

| Ingredient | % |
|---|---|
| $K_4P_2O_7$ | 36.0 |
| $KNO_3$ | 59.0 |
| Aluminum Powder (2) | 0.5 |
| KCl | 4.5 |
| | 100.0% |

Example 3

| Ingredient | % |
|---|---|
| Ethylenediaminetetra-acetic Acid (Tetra-Sodium Salt) | 36.0 |
| $KNO_3$ | 16.0 |
| Aluminum Powder (3) | 0.5 |
| KCl | 47.5 |
| | 100.0% |

Example 4

| Ingredient | % |
|---|---|
| Ethylenediaminetetra-acetic Acid (Tetra-Sodium Salt) | 36.0 |
| $KNO_3$ | 59.0 |
| Aluminum Powder (2) | 0.5 |
| KCl | 4.5 |
| | 100.0% |

Example 5

| Ingredient | % |
|---|---|
| Nitrilotriacetic Acid (Tri-Sodium Salt) | 36.0 |
| $KNO_3$ | 16.0 |
| Aluminum Powder (3) | 0.5 |
| KCl | 47.5 |
| | 100.0% |

Example 6

| Ingredient | % |
|---|---|
| Nitrilotriacetic Acid (Tri-Sodium Salt) | 36.0 |
| $NaNO_3$ | 59.0 |
| Aluminum Powder (2) | 0.5 |
| KCl | 4.5 |
| | 100.0% |

Example 7

| Ingredient | % |
|---|---|
| Nitrilotriacetic Acid (Tri-Sodium Salt) | 36.0 |
| $NaNO_3$ | 16.0 |
| Aluminum Powder (1) | 16.7 |
| NaCl | 31.3 |
| | 100.0% |

Example 8

| Ingredient | % |
|---|---|
| N-Hydroxyethylenediamine-triacetic Acid (Tri-Sodium Salt) | 36.0 |
| $KNO_3$ | 16.0 |
| Aluminum Powder (3) | 0.5 |
| KCl | 47.5 |
| | 100.0% |

Example 9

| Ingredient | % |
|---|---|
| N-hydroxyethylenediamine-triacetic Acid (Tri-Sodium Salt) | 36.0 |
| $NaNO_3$ | 59.0 |
| Aluminum Powder (2) | 0.5 |
| NaCl | 4.5 |
| | 100.0% |

Example 10

| Ingredient | % |
|---|---|
| Diethylenetriaminepenta-acetic Acid (Penta-Sodium Salt) | 36.0 |
| $KNO_3$ | 16.0 |
| Aluminum Powder (3) | 0.5 |
| KCl | 47.5 |
| | 100.0% |

Example 11

| Ingredient | % |
|---|---|
| Diethylenetriaminepenta-acetic Acid (Penta-Sodium Salt) | 36.0 |
| $KNO_3$ | 59.0 |
| Aluminum Powder (2) | 0.5 |
| NaCl | 4.5 |
| | 100.0% |

Example 12

| Ingredient | % |
|---|---|
| Saccharin (Sodium Salt) | 36.0 |
| $KNO_3$ | 16.0 |
| Aluminum Powder (3) | 0.5 |
| KCl | 47.5 |
| | 100.0% |

Example 13

| Ingredient | % |
|---|---|
| Saccharin (Sodium Salt) | 73.0 |
| $NaNO_3$ | 16.0 |
| Aluminum Powder (2) | 0.5 |
| KCl | 10.5 |
| | 100.0% |

Example 14

| Ingredient | % |
|---|---|
| Saccharin (Sodium Salt) | 36.0 |
| $KNO_3$ | 59.0 |
| Aluminum Powder (1) | 0.5 |
| KCl | 4.5 |
| | 100.0% |

Example 15

| Ingredient | % |
|---|---|
| Para Hydroxybenzoic Acid (Di-Sodium Salt) | 36.0 |
| $NaNO_3$ | 16.0 |
| Aluminum Powder (3) | 0.5 |
| NaCl | 47.5 |
| | 100.0% |

Example 16

| Ingredient | % |
|---|---|
| Para Hydroxybenzoic Acid (Di-Sodium Salt) | 36.0 |
| $NaNO_3$ | 59.0 |
| Aluminum Powder (2) | 0.5 |
| KCl | 4.5 |
| | 100.0% |

—Continued

Example 17
| Ingredient | |
|---|---|
| Para Hydroxybenzoic Acid (Di-Sodium Salt) | 36.0 |
| K NO₃ | 16.0 |
| Aluminum Powder (1) | 16.7 |
| K Cl | 31.3 |
| | 100.0% |

Example 18
| Ingredient | |
|---|---|
| Hydroquinone (Sodium Salt) | 36.0 |
| K NO₃ | 16.0 |
| Aluminum Powder (3) | 0.5 |
| K Cl | 47.5 |
| | 100.0% |

Example 19
| Ingredient | |
|---|---|
| Hydroquinone (Sodium Salt) | 36.0 |
| Na NO₃ | 59.0 |
| Aluminum Powder (2) | 0.5 |
| Na Cl | 4.5 |
| | 100.0% |

Example 20
| Ingredient | |
|---|---|
| Alpha Aminoacetic Acid (Sodium Salt) | 36.0 |
| K NO₃ | 16.0 |
| Aluminum Powder (3) | 0.5 |
| K Cl | 47.5 |
| | 100.0% |

Example 21
| Ingredient | |
|---|---|
| Alpha Aminoacetic Acid (Sodium Salt) | 36.0 |
| K NO₃ | 59.0 |
| Aluminum Powder (1) | 0.5 |
| K Cl | 4.5 |
| | 100.0% |

Example 22
| Ingredient | |
|---|---|
| Salicylic Acid (Di-Sodium Salt) | 36.0 |
| K NO₃ | 16.0 |
| Aluminum Powder (3) | 0.5 |
| K Cl | 47.5 |
| | 100.0% |

Example 23
| Ingredient | |
|---|---|
| Salicylic Acid (Di-Sodium Salt) | 36.0 |
| K NO₃ | 59.0 |
| Aluminum Powder (1) | 0.5 |
| K Cl | 4.5 |
| | 100.0% |

A unique feature of the compositions of the invention is the prevention of the precipitation of Al(OH)₃ in any appreciable amount. It would not be expected that the reaction product Na₂HPO₄ would be a strong enough base to convert most of the insoluble Al(OH)₃ to the more soluble sodium aluminate.

The reaction rate may be slowed by controlling the particle size of the ingredients and the reaction rate may be readily varied by changing the bulk density, granulation and relative proportions of ingredients. The reaction rate may also be controlled by fusing the dry mixture and then granulating.

FIG. 1 shows the effect of particle size and temperature when 30 grams of the product are added to 100 ml. of water. The composition and particle size range for samples shown in FIG. 1 are as follows:

| Composition (Fused-Granulated Screened) | | Particle Size (microns) |
|---|---|---|
| Aluminum Powder | 4.1% | Sample A—4760 to 6100 |
| Tri-sodium Phosphate | 25.0% | do. B—2380 to 4760 |
| Potassium Nitrate | 35.0% | do. C— 841 to 2380 |
| Potassium Chloride | 35.9% | do. D—less than 841 |

Figure 2:
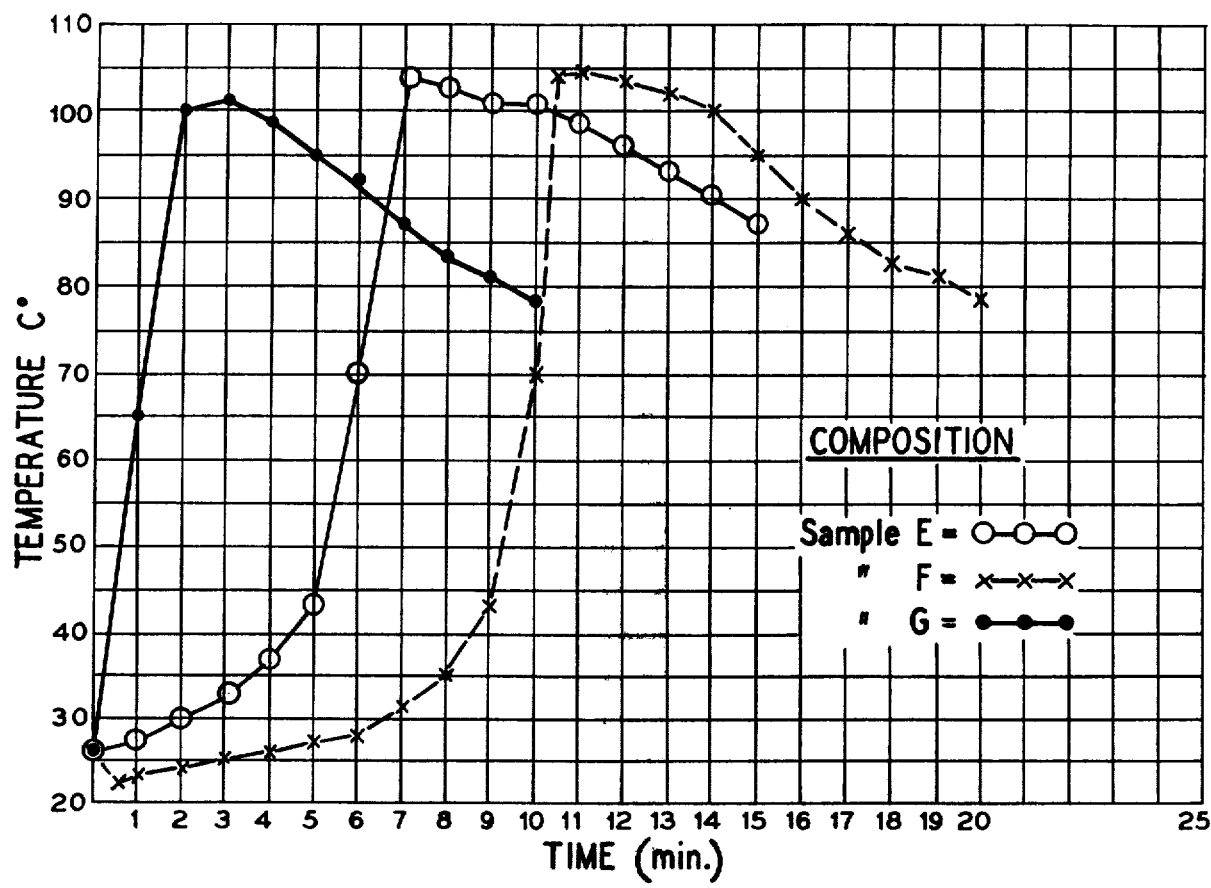

A similar plot of the effect of composition is given in FIG. 2. The composition of each sample for FIG. 2 is given below.

Each formulation was fused, granulated and screened to a particle size range of from 841 to 2380 microns.

Figure 3:
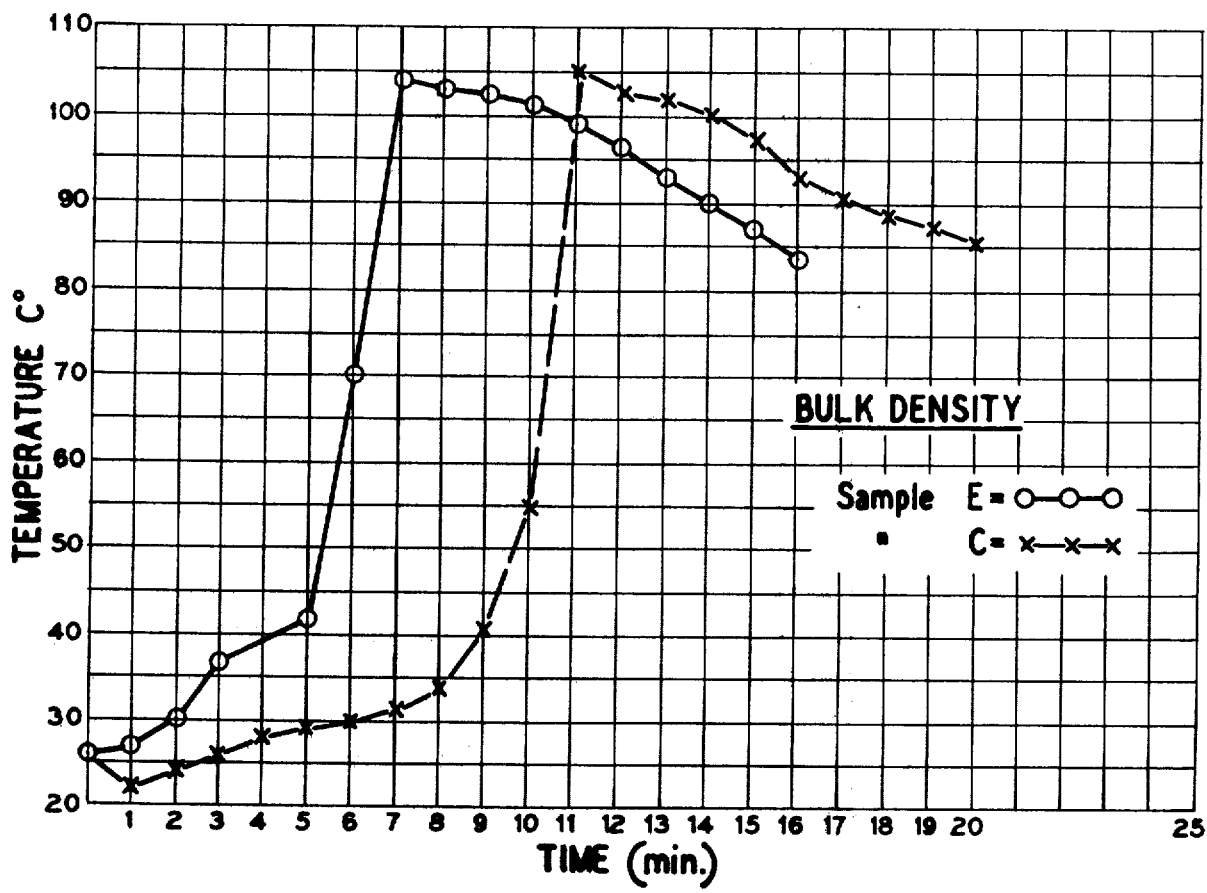

The effect of bulk density can be seen from FIG. 3. In this experiment bulk density was varied by using powdered tri-sodium phosphate and granular tri-sodium phosphate. Samples were fused, granulated and screened to a particle size range of from 841 to 2380 microns.

| Ingredient | Sample C (%) | Sample E (%) |
|---|---|---|
| Aluminum Powder | 4.1 | 4.1 |
| Tri-sodium Phosphate | 25.0 (Granular) | 25.0 (Powdered) |
| Potassium Nitrate | 35.0 | 35.0 |
| Potassium Chloride | 35.9 | 35.9 |
| | 100.0% | 100.0% |
| Bulk Density | 1.05 | .85 |

The results presented in FIGS. 1, 2, and 3 show the effect of composition, particle size, and bulk density on the delayed action of the produce.

| Ingredient | Sample E (%) | Sample F (%) | Sample G (%) |
|---|---|---|---|
| Aluminum Powder | 4.1 | 4.1 | 4.1 |
| Tri-sodium Phosphate (Powdered) | 25.0 | 15.6 | 73.2 |
| Potassium Nitrate | 35.0 | 22.7 | 22.7 |
| Potassium Chloride | 35.9 | 57.6 | 0.0 |
| | 100.0% | 100.0% | 100.0% |

What is claimed is:

1. A heat-producing, drain-cleaning composition comprising (a) powdered aluminum having a particle size from 1 to 300 microns, in an amount from about 0.5 to about 16.7% by weight; (b) an alkali metal nitrate in an amount from about 16 to about 59% by weight; and (c) an alkali metal salt of an acid, wherein said acid has at least one hydrogen atom with an ionization constant in water not exceeding $6.0 \times 10^{-9}$, in an amount from about 36 to about 73.2% by weight, wherein said acid is a member of the group consisting of:
   salicylic acid
   alpha Aminoacetic acid
   hydroquinone
   para hydroxybenzoic acid
   saccharin
   carbonic acid
   pyrophosphoric acid
   ethylenediaminetetraacetic acid
   diethylenetriaminepentaacetic acid
   N-Hydroxyethylenediaminetriacetic acid
   nitrilotriacetic acid
   phosphoric acid 2. A heat-producing, drain-cleaning composition comprising (a) powdered aluminum having a particle size from 1 to 300 microns, in an amount from about 0.5 to about 16.7% by weight; (b) an alkali metal nitrate in an amount from about 16 to about 59% by weight; and (c) an alkali metal salt of an acid, wherein said acid has at least one hydrogen atom with an ionization constant in water not exceeding $6.0 \times 10^{-9}$, wherein the amount of said aluminum and of said salt is such that upon contact of said composition with water, the initial amount of heat produced will provide (1) the heat loss due to dissipation from the system and (2) sufficient heat to raise the temperature of the surrounding water and suspended solids so that the autocatalytic effect of the temperature will provide an increased rate of reaction resulting in a hot boiling mixture; the amount of said salt being from about 36 to about 73.2% by weight, wherein said acid is a member of the group consisting of;
   salicylic acid
   alpha aminoacetic acid
   hydroquinone
   para hydroxybenzoic acid
   saccharin
   carbonic acid
   pyrophosphoric acid
   ethylenediaminetetraacetic acid
   diethylenetriaminepentaacetic acid
   N-hydroxyethylenediaminetriacetic acid
   nitrilotriacetic acid
   phosphoric acid 3. A composition according to claim 1 wherein said nitrate is sodium nitrate.

4. A composition according to claim 1 wherein said nitrate is potassium nitrate.

5. A composition according to claim 1 wherein the nitrate is sodium nitrate and the salt is tri-sodium phosphate.

6. A composition according to claim 1 wherein the nitrate is potassium nitrate and the salt is tri-potassium phosphate.

7. A composition according to claim 1 wherein the nitrate is sodium nitrate and the salt is tri-potassium phosphate.

8. A composition according to claim 1 wherein the salt is tetrasodium pyrophosphate.

9. A composition according to claim 1 wherein the salt is sodium tripolyphosphate.

10. A composition according to claim 1 which additionally comprises 0.02% of a surfactant, wherein the surfactant is a member of the group consisting of sulfonated mineral oil, a combination of mono and disphosphate esters of an ethoxylated linear alcohol, and an oxyethylated primary straight chain alcohol wherein the alcohol contains from 12 to 20 carbon atoms.

11. A composition according to claim 1 which comprises additionally 36% potassium chloride.

12. A composition according to claim 1 wherein the nitrate is potassium nitrate and the salt is tri-sodium phosphate.

13. A composition according to claim 12 wherein the ingredients are present in the following amounts:

| | |
|---|---|
| Aluminum Powder | 5.0 grams |
| Potassium Nitrate | 59.0 grams |
| Tri-sodium Phosphate | 36.0 grams. |

14. A composition according to claim 7 wherein the ingredients are present in the following amounts:

| | |
|---|---|
| Aluminum Powder | 1.7 grams |
| Sodium Nitrate | 20.0 grams |
| Tri-potassium Phosphate | 18.3 grams. |

15. A composition according to claim 12 wherein the ingredients are present in the following amounts:

| | |
|---|---|
| Aluminum Powder | 1.2 grams |
| Potassium Nitrate | 0.8 grams |
| Tri-sodium Phosphate | 3.0 grams. |

16. A composition according to claim 1 wherein the nitrate is sodium nitrate and the salt is di-sodium carbonate.

17. A composition according to claim 16 wherein the ingredients are present in the following amounts:

| | |
|---|---|
| Aluminum Powder | 1.5 grams |
| Sodium Nitrate | 12.0 grams |
| Di-sodium Carbonate | 16.5 grams. |

18. A composition according to claim 1 wherein the nitrate is potassium nitrate and the salt is di-sodium carbonate.

19. A composition according to claim 18 wherein the ingredients are present in the following amounts:

| | |
|---|---|
| Aluminum Powder | 3.8 grams |
| Potassium Nitrate | 30.0 grams |
| Di-sodium Carbonate | 41.2 grams. |

20. A composition according to claim 1 wherein the nitrate is potassium nitrate and the salt is tetra-sodium pyrophosphate.

21. A composition according to claim 20 wherein the ingredients are present in the following amounts:

| Aluminum Powder | 4.2 grams |
| Potassium Nitrate | 30.0 grams |
| Tetra-sodium Pyrophosphate | 50.0 grams. |

22. A composition according to claim 1 wherein the nitrate is potassium nitrate and the salt is tetra-potassium pyrophosphate.

23. A composition according to claim 22 wherein the ingredients are present in the following amounts:

| Aluminum Powder | 2.5 grams |
| Potassium Nitrate | 20.0 grams |
| Tetra-potassium Pyrophosphate | 27.5 grams. |

24. A composition according to claim 1 wherein said acid is salicylic acid.

25. A composition according to claim 1 wherein said acid is alpha aminoacetic acid.

26. A composition according to claim 1 wherein said acid is hydroquinone.

27. A composition according to claim 1 wherein said acid is parahydroxybenzoic acid.

28. A composition according to claim 1 wherein said acid is saccharin.

29. A composition according to claim 1 wherein said acid is carbonic acid.

30. A composition according to claim 1 wherein said acid is phosphoric acid.

31. A composition according to claim 1 wherein said acid is pyrophosphoric acid.

32. A composition according to claim 1 wherein said acid is ethylenediaminetetraacetic acid.

33. A composition according to claim 1 wherein said acid is diethylenetriaminepentaacetic acid.

34. A composition according to claim 1 wherein said acid is N-hydroxyethylenediaminetriacetic acid.

35. A composition according to claim 1 wherein said acid is nitrilotriacetic acid.

36. A composition according to claim 30 which additionally contains 2% of a non-aqueous, tacky, liquid surfactant.

37. A drain-cleaning, heat-producing composition in accordance with claim 1 wherein said aluminum powder has a particle size of from 15 to 50 microns.

38. A heat-producing, drain-cleaning composition according to claim 1, wherein the ingredients are present in an amount such that the mole ratio of the aluminum powder to the salt of the acid to the alkali metal nitrate is 8 to 5 to 3.

* * * * *